No. 849,928. PATENTED APR. 9, 1907.
D. M. SMITH.
HARROW TOOTH.
APPLICATION FILED SEPT. 13, 1906.

Inventor
D. M. Smith

Witnesses
G. R. Thomas
H. C. McCartney

By
Attorneys

UNITED STATES PATENT OFFICE.

DAVIT M. SMITH, OF SIXMILE, ARKANSAS.

HARROW-TOOTH.

No. 849,928.     Specification of Letters Patent.     Patented April 9, 1907.

Application filed September 13, 1906. Serial No. 334,520.

*To all whom it may concern:*

Be it known that I, DAVIT M. SMITH, a citizen of the United States, residing at Sixmile, post-office, in the county of Franklin, State of Arkansas, have invented certain new and useful Improvements in Harrow-Teeth; and I do hereby declare the following to be a full, clear, and exact description of the invention, such as will enable others skilled in the art to which it appertains to make and use the same.

The present invention has reference to harrow-teeth, and it aims to provide an improved ground-treating implement of that class which consists of two parts—namely, a shank and a blade carried thereby and laterally movable with respect thereto—whereby the distance between the adjacent cuts or furrows may be varied at will.

The invention will be readily understood from the following detailed description, and its preferred embodiment is illustrated in the accompanying drawings, in which like parts are designated by corresponding reference-numerals in both views.

Figure 1:
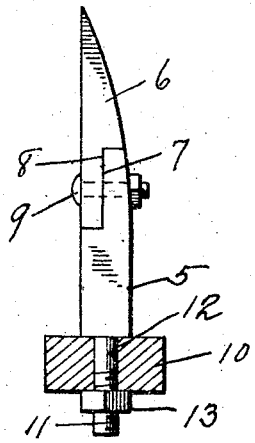
Figure 2:
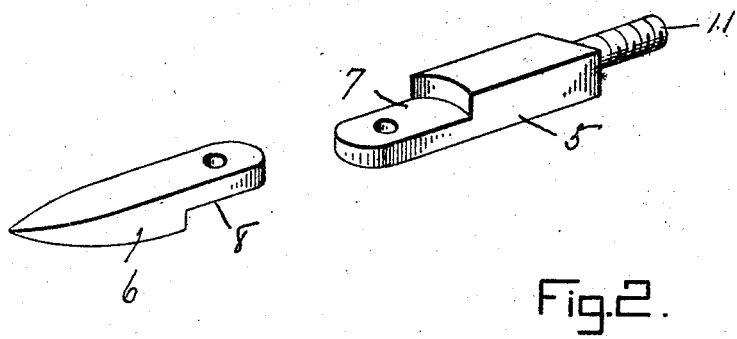

Of the said drawings, Figure 1 is a side elevation of the improved harrow-tooth attached to one of the cross-beams of a harrow, the beam itself being shown in section. Fig. 2 is a perspective view of one of the teeth with its parts detached.

Referring more particularly to the drawings, the tooth is shown as comprising a shank 5 and a curved blade 6, the former having an undercut recess 7 formed in its inner face toward its lower end to receive the blade, which is likewise provided with a correspondingly-formed recess 8, so that the front and rear faces of the shank are approximately flush with those of the blade.

The blade and shank of each tooth are connected by means of a bolt 9, passing through the reduced ends thereof and serving as a pivot to allow the blade to be set at an angle to one side or the other of its shank, thus varying the space between the adjacent furrows or cuts. The adjacent ends of the blade and shank and the shoulders formed by their undercut portions are curved to permit such swinging movement.

In Fig. 1 the tooth is shown as attached to one of the cross-beams 10 of a harrow, the shank 5 of the tooth including a threaded stem 11, which fits in an opening 12 therein and projects therebeyond at its free end, being retained in such position by means of a nut 13. It is to be understood, however, that the harrow itself, to which the teeth are attached, forms no part of the present invention and may be of either the rotary or the drag type. Illustration of the harrow is therefore deemed unnecessary.

What is claimed is—

1. A harrow-tooth comprising a shank provided at one end with an undercut seat formed on its inner face, and a blade pivotally mounted in said seat and adapted to move laterally therein.

2. A harrow-tooth comprising a shank provided at one end with an inclined undercut seat formed on its inner face, and a blade pivotally mounted in said seat and adapted for an independent lateral movement therein, said blade being inclined with respect to its shank.

3. A harrow-tooth comprising a shank provided at one end with an undercut seat formed on its inner face, and a blade having a reduced end pivotally mounted in said seat, whereby the lateral position of said blade may be adjusted with respect to its shank.

4. A harrow-tooth comprising a shank, and a blade set at an angle to said shank and adapted to be laterally adjusted with respect thereto.

5. A harrow-tooth comprising a shank portion provided at one end with an undercut seat formed in its inner face, the opposite ends of said seat being rounded, and a blade pivoted to said shank and provided with a reduced portion engaged in said seat and rounded at its inner end, whereby said blade may be laterally adjusted with respect to its shank.

6. A harrow-tooth comprising a shank portion provided at one end with an undercut inclined seat formed in its inner face, the opposite ends of said seat being rounded, and a blade pivoted to said shank and provided with a reduced portion engaged in said seat and rounded at its inner end, whereby said blade may be laterally adjusted with respect to its shank, said blade being inclined with respect to its shank.

In testimony whereof I affix my signature in presence of two witnesses.

DAVIT M. SMITH.

Witnesses:
J. A. HUTCHENS,
J. W. BROWN.